June 26, 1962 C. J. P. LÈBRE 3,041,101
CLAMPING TONGS FOR LOADS
Filed Jan. 22, 1959 3 Sheets-Sheet 1
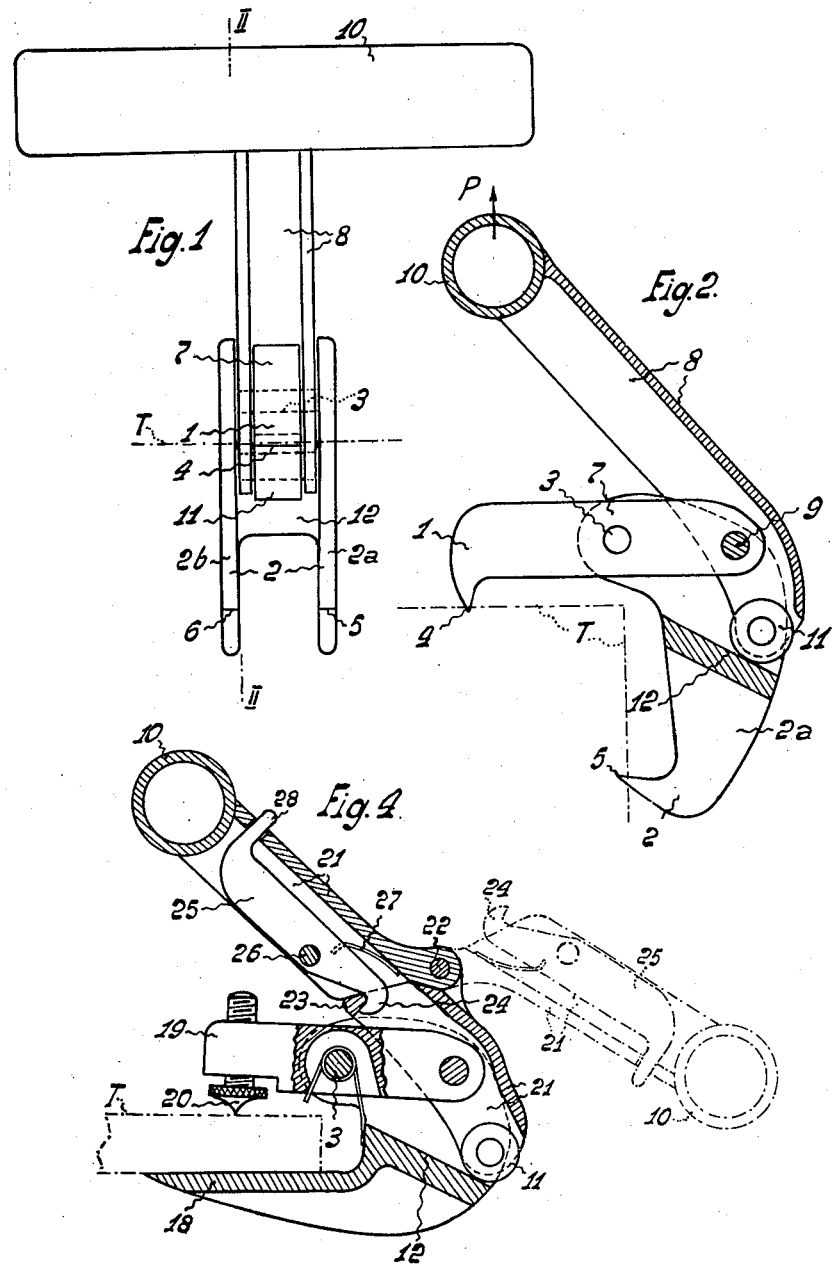

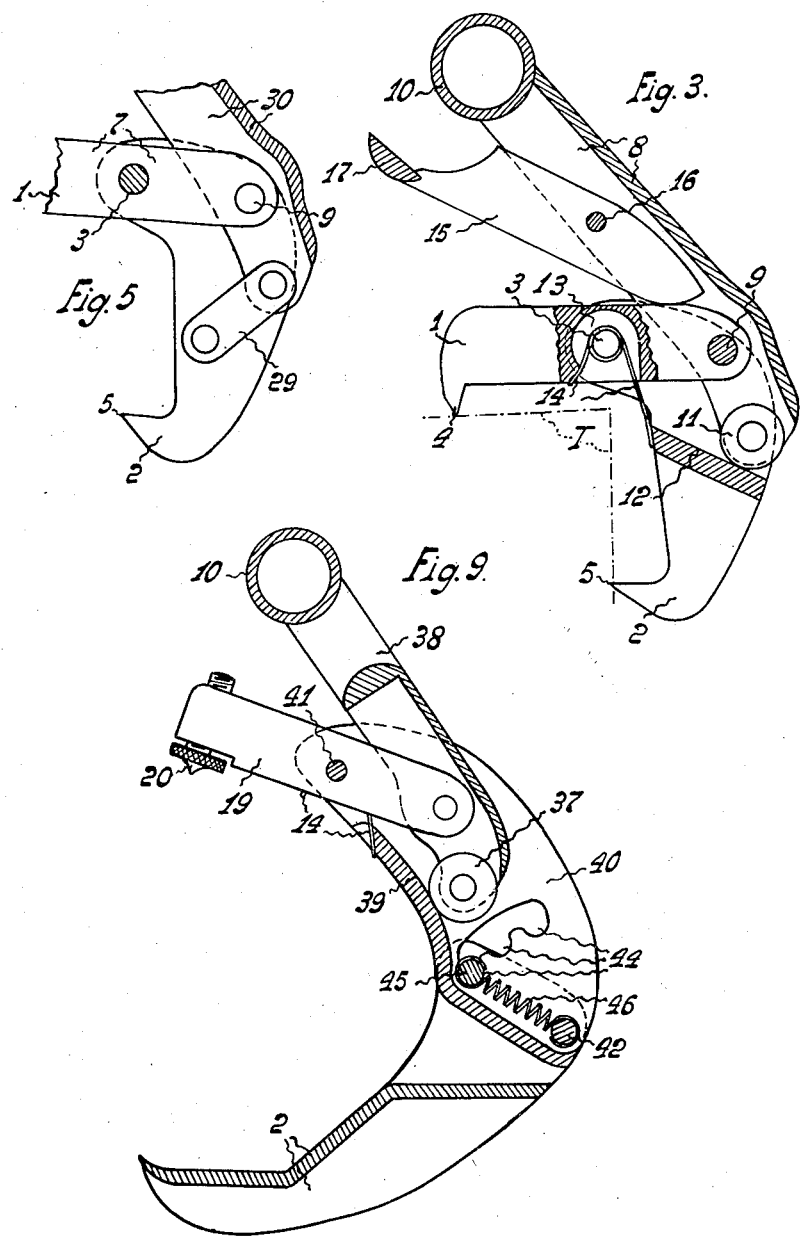

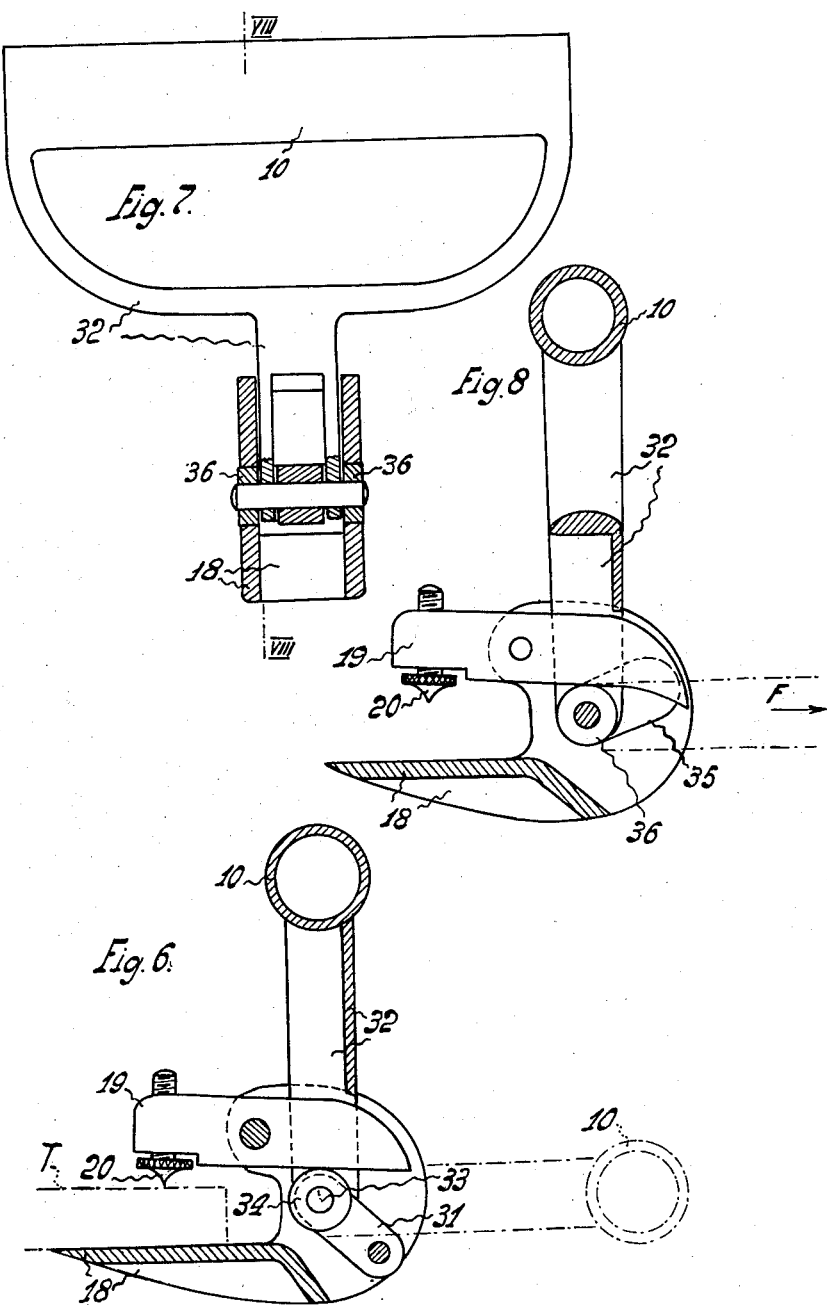

United States Patent Office 3,041,101
Patented June 26, 1962

3,041,101
CLAMPING TONGS FOR LOADS
Charles Jean Pierre Lèbre, 35, Avenue de l'Orangerie,
Sainte-Genevieve-des-Bois, France
Filed Jan. 22, 1959, Ser. No. 788,353
Claims priority, application France Jan. 23, 1958
8 Claims. (Cl. 294—26)

The present invention relates to clamping tongs for loads.

The clamping tongs, according to the invention, have two tongs jaws connected to each other by means of a pivot pin. The first jaw is a double-armed lever, to the mid-portion of which an end of the second jaw is pivoted. The end of the double armed lever opposite the jaw end is pivoted to another double-armed lever which is a common leg that serves to adjust the tongs jaws. One end of this common leg is formed into a carrying member, and the other end mounts a member for adjusting the jaws with respect to each other.

In the accompanying drawing, a number of embodiments according to the invention are illustrated, in which:

FIG. 1 shows a front view of clamping tongs incorporating the invention,

FIG. 2 is a section on the line II—II in FIG. 1,

FIG. 3 is a section similar to FIG. 2, and illustrates a second embodiment of the invention, FIG. 4 is a section similar to FIG. 2, and illustrates a third embodiment of the invention, FIG. 5 is a partial view of a section similar to FIG. 2 and illustrates another embodiment of the invention.

FIG. 6 is a section similar to that according to FIG. 2, and illustrates a fourth embodiment of the invention.

FIG. 7 is a rear view partially in section of a fifth embodiment of the invention.

FIG. 8 is a section on the line VIII—VIII in FIG. 7 and

FIG. 9 is a section similar to FIGS. 2 and 8 illustrating a sixth embodiment of the invention.

In the embodiment of the invention illustrated in FIGS. 1 and 2, two jaws 1 and 2 respectively are provided, the jaws being connected to each other by a pivot pin 3. The jaws 1 and 2 carry teeth 4, 5 and 6 for gripping a load T.

The jaw 1 forms one end of a double-armed lever 7. On the lever end opposite to the jaw, another double-armed lever 8 is pivotally connected by pivot pin 9. This lever 8 is provided at its upper end with a carrying handle 10, while the lower end rotatably mounts a roller 11 between the double arms. The roller 11 engages a control surface 12 on an integral transverse member joining the two walls 2a and 2b that form the jaw 2. The control surface 12 is arranged to slant upward from the outer to the inner sides of the jaw 2. The double-armed lever 8 thus forms a common leg for jaws 1 and 2.

When raising the carrying handle 10 in the direction of the arrow P, the teeth 4, 5 and 6 grip on a corner of the load T that is to be lifted, the lever 8 moving toward a vertical position. The roller 11 rolls toward pivot pin 3 along the control surface 12, so that the pivot pin 9 moves upwards with respect to jaw 2, and the lever 7, with the clamping jaw 1, is thereby rotated about pivot pin 3 so that the tooth 4 is pressed into the load T. The load is thus clamped between the jaws 1 and 2 and held by the teeth 4, 5 and 6 until the carrying handle is released.

The embodiment of the clamping tongs according to FIG. 3 differs from that in FIG. 1 in that a spring 14 is arranged around the pivot pin 3, in a recess 13 in the lever arm with the jaw 1. The ends of the spring 14 engage with the jaws 1 and 2 in such a way that they tend to separate the jaws and the teeth 4, 5 and 6. For forcibly moving the teeth apart when releasing the clamping tongs from the load T, a double-armed lever 15 is provided, which is pivoted by a pivot pin 16 to the lever 8 and which is fitted with a handle portion 17 near the carrying handle 10. The other end portion of this lever 15 is curved and engages the end opposite jaw 1 of the lever 7 so that pressure tending to bring the handles of levers 15 and 8 together forces the pivoted end of the lever with jaw 1 downward with respect to jaw 2, causing the roller 11 to roll downward on the inclined control surface 12 between the double arms 2a and 2b, thus reversing the movement of the roller 11 as explained in the preceding paragraph to raise the jaw 1.

In the embodiment according to FIG. 4 of a clamping tongs for plate-shaped loads such as metal sheets, boards, etc., there are provided a relatively thin jaw 18 flat on its upper side, and also a jaw 19 with a centre tooth 20 adjustable in the jaw by a screw. The other parts of the clamping tongs are arranged, and in part constructed, similarly to the parts heretofore described in prior embodiments. A difference exists in the construction of the double-armed lever 21 with the carrying handle 10 at one end and the roller 11 at the other. This double-armed lever 21 comprises two parts which are connected to each other by means of a pivot pin 22. On the lower part of the lever a transverse lug 23 is provided, into which a hook 24 on an end of a double-armed lever 25 can engage, in order to couple the two parts of the lever 21 together. The lever 25 is pivoted to the upper portion of lever 21 by a pivot pin 26. A spring 27 keeps the lever 25 with its hook 24 in engagement with the transverse lug 23. A projection 28 on the other end of lever 25 is provided as a thumb actuated means to oscillate lever 25 around its pivot 26 to release the hook 24 from the transverse lug 23, after which the upper part of the lever 21 can be swung round the pivot pin 22 and brought into the position shown in dash-dotted lines in FIG. 4. In this position, the clamping tongs can be used to withdraw thin loads, for instance metal sheets, laterally from a pile of such articles. When a pull is exerted on the carrying handle in the plane of the sheet, the tongs will also be closed by means of the roller 11 and the control surface 12.

In the case of the embodiment of the invention according to FIG. 5, a link 29 is arranged between the lower end of the double-armed lever 30, fitted with the carrying handle, and the part carrying the jaw 2. The effect of this, when the carrying handle 10 is raised, is a bell-crank-like action for closing the jaws. To the lower portion of a double armed lever 30, only one arm of which is illustrated in FIG. 5, a lever 7 is pivoted at one of its ends by a pivot pin 9. The other end of lever 7 forms an upper jaw 1 of the tongs. A lower jaw 2 of the tongs is pivoted by pivot pin 3 to the lever 7 intermediate the ends of said lever 7. A lever link 29 pivotally connects the lower portion of end of lever 30 and the jaw 2 intermediate the jaw tooth 5 and pivot pin 3. When the double armed lever 30 is raised, i.e., rotated clockwise about pivot 9 as viewed in FIG. 5, the link 29 is forced to the left causing the jaw 2 to rotate clockwise about pivot pin 3 and thus to close the jaws 1 and 2.

In the embodiment of the invention according to FIG. 6 a rod 32 is mounted for oscillation about a pivot pin 33. A link 31 is pivotally connected at one end to the part carrying the jaw 18, and at the other end by pivot pin 33 to the lower end of a rod 32 which is fitted at the other end with carrying handle 10. On the rod 32, a roller 34 is mounted for rotation on the pivot pin 33 and adapted to engage the opposite end of the double-armed lever from jaw 19. When raising the rod 32, the roller 34 moves in a direction away from the jaws and the link 31 is swivelled and the roller 34 runs along the lever carrying the jaw 19 thus closing the jaws 18 and 19.

The rod 32 with the carrying handle can be swivelled through 90° into the position drawn in dash-dotted lines, and the clamping tongs can be used for withdrawing sheet-like loads from a pile of such sheets. Thus any force applied to the handle 10 away from the jaws 18 and 19 will cause them to close.

The embodiment of the invention according to FIGS. 7 and 8 is similarly constructed to the embodiment of FIG. 6, the rod 32 with the carrying handle 10 and a roller 36 similar to roller 34 are also provided. These clamping tongs serve for the lateral withdrawal of sheet-like loads from a pile, for which purpose the rod 32 is swung through 90° into the position indicated by dash-dotted lines. In the side walls of the jaw 18, between which the rod 32 can be swivelled round the pivot pin of the roller 36, inclined grooves 35 are arranged in which roller 36 moves thereby causing the jaws 18 and 19 to approach each other when the rod is drawn downward and pulled in the direction of the arrow F.

The last embodiment according to FIG. 9 is somewhat similar to the clamping tongs according to FIG. 4, in that the jaw 19 carries, as in FIG. 4, the centre tooth 20 adjustable by means of a screw thread. The double-armed lever 38 is fitted at one end with the carrying handle 10. A roller 37 is mounted for rotation at the other end of lever 38 and is adapted to engage a control surface 39 on a part 40, to which the double armed-lever bearing the jaw 19 with the centre tooth 20 at one end is pivoted by means of a pivot pin 41. The lever having jaw 19 is pivotally connected at the end opposite the jaw 19 end to the lower portion of lever 38.

The part 40 is arcuately shaped and has a hole for a pivot pin 42 defined near the outer side of the lower end. A slot is cut in part 40 defining three holes 44 for a pin 45. The holes 44 are radially spaced from the hole for pivot pin 42, one of the three holes being positioned near the inner side of the lower end of part 40, and the slot extending toward the outer side. The jaw 2 is also arcuately shaped and has an upper end with inner and outer sides conforming in shape with the sides of the lower end of part 40 for being joined thereto. Two holes are defined in the upper end of jaw 2 near the inner and outer sides of the jaw and spaced apart the radius distance between the holes of the inner and outer sides of part 40. The jaw 2 is pivotally attached to part 40 by a pin 42 engaging the holes near the irrespective outer sides. The jaw 2 is pivoted about pivot pin 42 until the hole near the inner side coincides with one of the radially spaced holes of the part 40, and a pin 45 passing through these holes locks the jaw 2 rigidly to part 40. The angle jaw 2 makes with part 40 can be adjusted to one of three positions corresponding to which of the radially spaced holes of part 40 is made coaxial with the inner side hole of the jaw for both to engage with the pin 45. A spring 46 tensioned between the pins 45 and 42 retains the pins in place.

For heavy loads, the clamping tongs may be provided, not with a carrying handle, but with a carrying eye or a hook for attaching to a lifting block or to a crane.

What I claim is:

1. Clamping tongs for loads comprising: upper and lower jaws having ends comprising mutually opposing free ends and overlapping ends, the overlapping end of the lower jaw being pivotally connected to the upper jaw intermediate the ends of said upper jaw; a substantially straight common leg for operating the jaws, said leg having oppositely disposed top and bottom ends, the top end having a means for lifting the tongs; engaging means for engaging the common leg to the overlapping ends of said jaws, said engaging means including carrying means for associating the overlapping end of the upper tong jaw to the common leg intermediate the oppositely disposed ends of said common leg, and joining means intermediate the ends of the lower jaw for movably associating the bottom end of the common leg with the lower jaw, said engaging means being responsive to the relative positions of said jaws and legs for closing said jaws when a force directed away from said jaws is applied to said lifting means at the top end of said common leg.

2. Clamping tongs as described in claim 1 and characterized in that said carrying means comprises a pivot pin for pivotally connecting the upper jaw to the said leg, and said joining means comprises a roller mounted at the bottom end of the common leg and a ramp structure on the lower jaw having a control surface cooperative with said roller to pivot the upper jaw about its said pivot connection with said leg and to pivot the lower jaw about its pivot connection with the upper jaw, thereby causing said jaws to close when a force directed away from said jaws is applied to said lifting means at the top end of said common leg.

3. Clamping tongs as described in claim 1 and characterized in that said carrying means comprises a pivot pin for pivotally connecting said upper jaw to the common leg, and said joining means comprise a link pivoted to the bottom end of the common leg and to an intermediate part of the lower jaw, thereby linking said leg and the lower jaw for cooperative movement about their respective pivots to close said jaws when a force is applied in a direction away from said jaws to the lifting means at the top end of said leg.

4. Clamping tongs as described in claim 1 and characterized in that said carrying means comprise a roller mounted adjacent to the bottom end of the common leg, said roller having a periphery the uppper part of which is intermediate the ends of said common leg, and said roller contacting and supporting on its upper periphery the upper jaw relative to said common leg which thereby carries said upper jaw, and said joining means comprises an oblique slot defined in said lower jaw for engaging said roller and thereby joining said lower jaw to said leg, and said roller being rotated in said slot by a force applied in a direction away from the jaws, to said lifting means on said leg, and said jaws responsive to said engagement to rotate about their pivot to thereby close said jaws.

5. Clamping tongs as described in claim 1 and characterized in that said carrying means comprises a roller mounted adjacent the bottom of the common leg, said roller having a periphery the upper part of which is intermediate the ends of said common leg, and said roller contacting and supporting, on its upper periphery, said upper jaw relative to said common leg which thereby carries said upper jaw, and said joining means comprises a link pivoted at one end to the bottom end of said common leg for rotation with said roller and pivoted at the other end to said lower jaw thereby joining said lower jaw to said leg, said roller rollably engaging the overlapped end of the upper jaw intermediate the ends of said common leg, and said roller and link cooperating with said jaws respectively to close them as said leg is moved by a force applied in a direction away from said jaws to said lifting means.

6. Clamping tongs as described in claim 1 and characterized in that the lower jaw comprises two parts joined by a fixed pivot, and an adjustable pivot having a plurality of positions radially spaced from said fixed pivot, whereby the positions of said lower part relative to said upper part can be adjusted.

7. Clamping tongs as described in claim 1 and characterized in that said common leg comprises an upper and lower part pivotally connected, and a releasable locking means for locking said common leg in operating positions in which the said upper part is aligned with said lower part, and in which said upper part is an angular relation with said lower part.

8. Clamping tongs as described in claim 1 characterized in that said common leg has an attached auxilliary lever, said common leg and auxilliary lever being pivoted at their midportions, said auxilliary lever having a handle adjacent the handle of the common leg and a curved end portion oppositely disposed from said handle, said curved end portion being adjacent the upper jaw, whereby a pressure tending to join said adjacent lever handles pivots said auxiliary lever to engage the upper jaw thereby moving the overlapping end of the upper jaw with respect to the lower jaw to pivot said jaws.

References Cited in the file of this patent

UNITED STATES PATENTS

| | | |
|---|---|---|
| 1,251,278 | Porter | Dec. 25, 1917 |
| 1,479,711 | Haarberg | Jan. 1, 1924 |
| 2,210,904 | Durant | Aug. 13, 1940 |
| 2,342,506 | Wrobbel | Feb. 22, 1944 |
| 2,393,101 | Gardner | Jan. 15, 1946 |
| 2,618,504 | Penn | Nov. 18, 1952 |
| 2,654,629 | Renfroe | Oct. 6, 1953 |
| 2,708,592 | Dalkranian | May 17, 1955 |
| 2,776,856 | Ingram | Jan. 8, 1957 |
| 2,821,426 | Hanner | Jan. 28, 1958 |